United States Patent [19]
Tomoe

[11] Patent Number: 6,112,861
[45] Date of Patent: Sep. 5, 2000

[54] DISC BRAKE DEVICE

[75] Inventor: Seiji Tomoe, Funabashi, Japan

[73] Assignee: Nippon Ican Ltd., Tokyo, Japan

[21] Appl. No.: 09/121,378

[22] Filed: Jul. 23, 1998

[30] Foreign Application Priority Data

Jul. 23, 1997 [JP] Japan .................................. 9-196995

[51] Int. Cl.⁷ .................................................. F16D 55/02
[52] U.S. Cl. .................... 188/71.8; 188/72.9; 188/196 B
[58] Field of Search .................... 188/72.9, 72.6, 188/170, 71.8, 71.9, 196 B, 171, 58, 59, 200, 199, 71.1, 72.7, 196 R

[56] References Cited

U.S. PATENT DOCUMENTS

| | | | |
|---|---|---|---|
| 3,968,864 | 7/1976 | Deichsel et al. | 188/72.9 |
| 4,066,152 | 1/1978 | Pascal | 188/72.9 |
| 5,660,250 | 8/1997 | Treude | 188/72.9 |
| 5,782,321 | 7/1998 | Treude | 188/71.8 |
| 5,813,499 | 9/1998 | Staltmeir et al. | 188/72.9 |
| 5,873,434 | 2/1999 | Sugita et al. | 188/171 |
| 5,899,304 | 5/1999 | Daugherty | 188/171 |

*Primary Examiner*—Douglas C. Butler
*Attorney, Agent, or Firm*—Chapman & Cutler

[57] ABSTRACT

A disk brake device comprises a brake lever 3A toward which a tilting force is applied in opening operation. This brake lever 3A is formed at its lower end with an outwardly protruding stopper 58 into which an adjusting bolt 56 is screwed vertically. A base seat 59 is provided on a base plate 1 immediately under the stopper. A pinion 61 is fitted over an upper end of the adjusting bolt 56 via a one-way clutch 60 so as to rotate the adjusting bolt 56 only in a direction of fasting the same downward. A rack 67, which is supported by the base plate 1, is meshed with the pinion to have a predetermined backlash and to extend in a direction of swing of the brake levers 3A, 3B. This disk brake device allows to assuredly maintain the brake levers 3A, 3B at equally opened positions at left and right in a brake releasing condition, even if brake linings 9A, 9B are worn out and adjustment is made by an automatic lining wear adjusting unit 53 to automatically decrease the gap caused by wear of the brake linings 9A, 9B.

20 Claims, 15 Drawing Sheets

DISC BRAKE DEVICE

FIELD OF THE INVENTION

The present invention relates to a disk brake device used for general working machines such as hoisting machines.

BACKGROUND OF THE INVENTION

A disk brake device used for general industrial machines is shown for example in JP-A-07229527. Such disk brake device will be described with reference to FIGS. 9 to 20 enclosed herewith.

As shown in the figures, a pair of vertical brake levers 3A and 3B are opposedly arranged on a base plate 1 such that they are positioned one behind another in an axial direction DI of a vertically rotated brake disk 2 with the latter being arranged between the levers 3A and 3B. The brake levers 3A and 3B are pivotally mounted at their lower ends on a pair of brackets 4A and 4B arranged on the base plate 1 via horizontal shafts 5A and 5B extending radially from the brake disk 2 so that the brake levers 5A and 5B can be opened and closed at their upper ends in a vertical plane extending in the axial direction DI of the brake disk 2.

When FIG. 9 is taken to be a front view, each of the brake levers 3A and 3B is composed of paired front and back plates which are interconnected through a connecting rod 6A or 6B at their upper portions.

Each of the brake levers 3A and 3B has, at its intermediate portion between its upper and lower ends, a horizontal shaft 7A or 7B which is in parallel with the shafts 5A and 5B and is substantially at the level of an axis 11 of the brake disk 2. Pivoted to the shafts 7A and 7B are brake shoes 8A and 8B such that they are positioned between the front and back plates composing the brake levers 3A and 3B, respectively. The brake shoes 8A and 8B have mutually opposed surfaces on which are respectively applied brake linings 9A and 9B so as to clamp and brake the brake disk 2 from opposite sides.

The brake levers 3A and 3B respectively have, at their portions adjacent to their lower ends, outwardly protruding stoppers 11A and 11B with adjusting bolts 10A and 10B screwed vertically therein. Abutment of the adjusting bolts 10A and 10B at their lower ends on upper surfaces of base seats 12A and 12B, which are integrally formed on the base plate 1, will confine pivotal movements of the brake levers 3A and 3B away from the brake disk 2.

The one 3A of the brake levers has, at its portion adjacent to its upper end, a pivot shaft 13 which is in parallel with the shafts 5A and 5B. The pivot shaft 13 extends through the brake lever 3A in its thickness direction and further extends away from the lever 3A.

The pivot shaft 13 has, at its one end, two short levers 14 and 15 which are somewhat different in shape from each other and are positioned between the plates composing the brake lever 3A. The pivot shaft 13 has, at its tip, two bent levers 16 which are substantially same in shape.

The short levers 14 and 15 are substantially in the form of inverted L when seen from the front, and extend at their tips to positions substantially midway between the brake levers 3A and 3B and extend at their lower ends to positions below the pivot shaft 13. The bent levers 16 are substantially in the form of inverted L when seen from the front, and extend at their tips to positions adjacent to the top of the brake lever 3A and extend at their lower ends to positions slightly under the pivot shaft 13.

The levers 14, 15 and 16 are interconnected through connecting rods 17 which extend through the levers 14, 15 and 16 in front-to-back direction such that the levers 14, 15 and 16 can be swung in unison in vertical planes in parallel with a vertical plane on which the brake levers 3A and 3B are swung. Thus, a lever mechanism 55 is provided as a whole.

A frame 18 stands from the base plate 1 at a position adjacent to the other brake lever 3B and has a vertical thruster 20 pivoted at its lower end thereto via a horizontal shaft 19 which in turn is in parallel with the shafts 5A and 5B. The thruster 20 has a vertical rod 21 to an upper end of which a head 22 is fixed such that it is positioned between the levers 16. The head 22 is rotatably fitted over a horizontal shaft 23 which in turn is attached to the levers 16 in parallel with the shaft 19.

A vertical, hollow cylindrical casing 26 is pivoted at its lower end, through a horizontal shaft 25 in parallel with the shafts 5A and 5B, to a bracket 24 arranged on the base plate 1. Through a hollow portion 27 of the casing 26, a vertical rod 29 extends via an upper lid 28 fixed to the upper end of the casing 26 so the rod 29 can be moved up and down. A spring 31 is accommodated in the casing 26 and is arranged between the upper lid 28 and a base seat 30 fixed to the lower end of the rod 29 so that the rod 29 is always urged downward.

Mounted on an upper end of the rod 29 is a crosspiece 33 which has horizontal shafts 32 protruding therefrom at its opposite ends in parallel with the shaft 25. The horizontal shafts 32 are pivoted to the levers 16.

The lever 3B, 14 and 15 are interconnected through a rod-like connecting unit 34 which can be stretched in its axial direction D2. The crosspiece 36 is pivoted through a horizontal shaft 35 to a top of the brake lever 3B. A spindle 37 slanted downwardly from the brake lever 3B toward the brake lever 3A extends, at its end adjacent to the brake lever 3B, through the crosspiece 36 and is fixed by nuts (not shown). As shown in FIG. 12, fitted over an end of the spindle 37 adjacent to the brake lever 3A is a hollow cylindrical sleeve 40 which has a common axis 12 with the spindle 37.

Integrally connected to an end of the sleeve 40 adjacent to the brake lever 3A is a hollow cylindrical sleeve 41 which is loosely fitted over an outer periphery of the spindle 37, so that the sleeve 41 is aligned with the sleeve 40. A male screw 37a on the outer periphery of the spindle 37 is meshed with a female screw 41a on an inner periphery of the sleeve 41.

Fixed to an end of the sleeve 41 away from the sleeve 40 is a thread pin 42 which comprises a male screw portion 42a, a large diameter portion 42b contiguous with the portion 42a, a small diameter portion 42c contiguous with the portion 42b and a male screw portion 42d contiguous with the portion 42c. The portion 42a is screwed into the sleeve 41 and the portions 42b, 42c and 42d are protruded from the sleeve 41 in a direction away from the sleeve 40.

The sleeve 41 extends, at its middle portion in the axial direction D2, through a crosspiece 44 pivoted to the levers 14 and 15 via a horizontal shaft 43, and is rotatably supported by the crosspiece 44.

A thrust sleeve 45 is fitted over and fixed to the sleeve 41 so that the sleeve 45 is positioned between the sleeve 40 and the crosspiece 44. A washer 46 is fitted over the sleeve 41 between the sleeve 45 and the crosspiece 44. A washer 47 is fitted over the sleeve 41 between the crosspiece 44 and the large diameter portion 42b of the thread pin 42. The washers 46 and 47 confine movement of the crosspiece 44 in the axial direction D2 of the sleeve 41.

A one-way clutch 48 is fitted over the small diameter portion 42c of the thread pin 42, and at its side adjacent to the male screw portion 42d, a distance piece 49 is fitted. A nut 50 screwed on the male screw portion 42d prevents the one-way clutch 48 and the distance piece 49 from falling off from the portion 42c of the thread pin 42.

The one-way clutch 48 is of a known type in the art and comprises an inner ring 48a directly fitted over the portion 42c of the thread pin 42, an outer ring 48b fitted over the inner ring 48a and a plurality of rollers 48c between the rings 48a and 48b. The outer ring 48b can be rotated peripherally in a direction through rotation of the rollers 48c peripherally of the rings 48a and 48b and is prevented from being rotated peripherally in a reverse direction owing to wedge-like engagement of the rollers 48c with the rings 48a and 48b.

A hollow cylindrical collar stop 51 extends through the short lever 15 such that the stop 51 is in parallel with the shaft 13 and can be rotated with respect to the lever 15. An engaging pin 52 protruded radially from the outer ring 48b of he one-way clutch 48 is inserted at its tip into a hollow portion 51a the collar top 51.

A diameter of the engaging pin 52 is substantially ⅓ of an inner diameter of the hollow portion 51a of the collar stop 51. When the brake linings 9A and 9B are not worn out, swing movements of the levers 14, 15 and 16 around the pivot shaft 13 do not cause the engaging pin 52 to be pushed by an inner periphery of the collar stop 51 and the engaging pin 52 can be maintained horizontally as shown in FIGS. 13 and 14.

However, when the brake linings 9A and 9B are worn out and therefore the levers 16, 14 and 15 are swung more, the engaging pin 52 is pushed up or down by the inner periphery of the collar stop 51 as shown in FIGS. 15 and 16.

The one-way clutch 48 is designed such that, when the engaging pin 52 is pushed upward, only the outer ring 48b is rotated; and when the engaging pin 52 is pushed downward, the outer ring 48b is locked.

Thus, the connecting unit 34 comprises the spindle 37, the sleeves 40 and 41 and the thread pin 42; and an automatic wear compensating unit 53 comprises the one-way clutch 48, the engaging pin 52 and the collar stop 51.

In the Figures, reference numeral 54 represents a spring pin which extends radially of the sleeve 41 and thread pin 42 and connects and fixes the sleeve 41 to the thread pin 42.

In the disk brake device as described above, when the thruster 20 is actuated to move up the rod 21, an upward force is applied to the bent levers 16 via the head 22 and shaft 23. As a result, in resisting the push-down force of the spring 31 as shown in FIG. 11, the bent levers 16 are swung clockwise about the pivot shaft 13 in a direction a as shown in FIG. 9. The short levers 14 and 15 are also swung clockwise about the pivot shaft 13 in the direction a in unison with the levers 16.

As a result, the shaft 43 of the crosspiece 44 is rotated clockwise in the direction a as shown in FIG. 9 by the short levers 14 and 15 so that the crosspiece 44 pushes the spindle 37 of the connecting unit 34 along the axis 12 in a direction b shown in FIG. 12 via the sleeve 45, 40 and 41. This causes the brake levers 3A and 3B to open at their upper ends. The brake lever 3B is swung counterclockwise about the shaft 5B in a direction c as shown in FIG. 9 and the brake lever 3A is swung counterclockwise about the shaft 5A in a direction e as shown in FIG. 9. Abutment of the adjusting bolts 10A and 10B of the stoppers 11A and 11B at their lower ends on the upper surfaces of the base seats 12A and 12B confines final opening positions of the brake levers 3A and 3B, so that the brake levers 3A and 3B stop as they are equally opened at left and right. As a result, the brake linings 9A and 9B of the brake shoes 8A and 8B are separated away from braking surfaces of the brake disk 2 to release the braking of the brake disk 2.

On the other hand, when the thruster 20 is not activated, the levers 16 are swung counterclockwise about the shaft 13 in FIG. 9 by the push-down force of the spring 31 so that the rod 21 is moved down via the shaft 23. Swing movements of the levers 16 counterclockwise in FIG. 9 cause the short levers 14 and 15 to be also swung counterclockwise in FIG. 9 about the pivot shaft 13 so that, as shown in FIG. 12, the connecting unit 34 is withdrawn in a direction f along the axis 12 of the spindle 37 and sleeves 40, 41 and 45. Contrary to the opening operation as described above, this causes the brake levers 3A and 3B to close at their upper ends. As a result, the brake linings 9A and 9B of the brake shoes 8A and 8B are contacted with the braking surfaces of the brake disk 2. The brake disk 2 is clamped by the brake linings 9A and 9B from the opposite sides to brake the brake disk 2.

In association with the brake-releasing or braking of the brake disk 2 as described above, the levers 14, 15 and 16 are swung clockwise or counterclockwise in FIG. 9 so that the collar stop 51 on the short lever 15 is also moved down or up.

When the brake linings 9A and 9B are not worn out, the engaging pin 52 protruded horizontally and radially outwardly from the outer ring 48b of the one-way clutch 48 is not pushed by the inner periphery of the collar stop 51. Accordingly, as shown in FIGS. 13 and 14, the engaging pin 52 is maintained horizontally, and the automatic wear compensating unit 53 is inoperative.

However, when the brake linings 9A and 9B are worn out and the thruster 20 is not activated, the brake levers 3A and 3B are swung about the shafts 5A and 5B toward the brake disk 2 in greater extent than the case where the brake linings 9A and 9B are not worn out. Then, an amount of swing of each of the levers 14, 15 and 16 about the pivot shaft 13 is increased.

For this reason, in a case where braking is performed with the thruster 20 being not activated, the levers 14, 15 and 16 are moved down at their sides toward the thruster 20 with respect to the pivot shaft 13 and are moved up at their sides toward the one-way clutch 48 with respect to the pivot shaft 13. As a result, a lowermost point on the inner periphery of the collar stop 51 fitted to the short lever 15 is engaged with the engaging pin 52 fitted to the outer ring 48b of the one-way clutch 48 so that the tip of the pin 52 is pushed upward as shown in FIG. 15.

Therefore, the outer ring 48b is swung counterclockwise with respect to the inner ring 48a in a direction g as shown in FIG. 15 and the engaging pin 52 is slanted with respect to the center of the small diameter portion 42c of the thread pin 42. In this case, the inner ring 48a is not swung.

On the other hand, when the thruster 20 is actuated to release the braking, the levers 14, 15 and 16 are swung clockwise about the pivot shaft 13 in FIG. 9, and the lever 15 at its side with the collar stop 51 is moved down.

As a result, the engaging pin 52 is pushed down by an uppermost point on the inner periphery of the collar stop 51; but the outer ring 48b of the one-way clutch 48 cannot be swung with respect to the inner ring 48a, and the rings 48a and 48b are integrally swung clockwise h and i as shown in FIG. 16.

Integral swing movements of the rings 4'8a and 48b cause the thread pin 42 and sleeves 41 and 40 to be swung in the same direction, so that the female screw of the sleeve 40 is rotated with respect to the male screw 37a of the spindle 37. This causes the spindle 37 to be moved in the axial direction D2 and withdrawn into the sleeves 40 and 41. As a result, shortened is a distance L (FIG. 9) between a center of the shaft 43 of the crosspiece 44 and a center of the shaft 35 of the crosspiece 36 along the axis 12 of the spindle 37, i.e., the effective length of the connecting unit 34, so as to automatically decrease gaps caused by wear of the brake linings 9A and 9B.

Therefore, according to the disk brake device as described above, gaps caused due to wear of the brake linings 9A and 9B can be steplessly decreased by the automatic wear compensating unit 53 so as to attain a constant braking force at all times.

In the disk brake device as described above, the braking is released by opening the brake levers 3A and 3B at their upper ends and the posture of the brake levers 3A and 3B is maintained by abutting the adjusting bolts 10A and 10B of the stoppers 11A and 11B at their lower ends on the upper surfaces of the base seats 12A and 12B. Accordingly, when in the opening operation the effective length of the connecting unit 34 is shortened by the automatic wear compensating unit 53 to displace final opening positions of the brake levers 3A and 3B closer toward the brake disk 2, extra gaps are formed between the lower ends of the adjusting bolts 10A and 10B and the upper surfaces of the base seats 12A and 12B in the opening operation. Therefore, there may be a possibility that the brake levers 3A and 3B are tilted as a whole toward the brake lever 3A because of unbalanced application of the push-down force of the spring 31.

More specifically, in a brake-releasing condition in initial setting as shown in FIG. 17 where the brake linings 9A and 9B are not yet worn out, the adjusting bolts 10 and 10B must be adjusted such that the brake linings 9A and 9B with thickness $T_A$ and $T_B$ ($T_A=T_B$) are respectively spaced apart from the brake disk 2 by gaps $G_A$ and $G_B$ corresponding to the effective stroke of the thruster 20 (FIG. 9) and are opened equally at left and right ($G_A=G_B$). In this case, the adjusting bolts 10A and 10B are adjusted to contact at their lower ends the upper surfaces of the base seats 12A and 12B when the gaps $G_A$ and $G_B$ are established.

Therefore, in a braking condition in the initial setting as described above as shown in FIG. 18, the brake linings 9A and 9B closely contact the brake disk 2, and gaps $S_A$ and $S_B$ are equally formed at left and right ($S_A=S_B$) between the lower ends of the adjusting bolts 10A and 10B and the upper surfaces of the base seats 12A and 12B.

When the disk brake device is used to perform braking in a case the brake linings 9A and 9B are worn out equally at left and right by wear amounts $\Delta T_A$ and $\Delta T_B$ ($\Delta T_A=\Delta T_B$), the gaps between the lower ends of the adjusting bolts 10A and 10B and the upper surfaces of the base seats 12A and 12B are increased by wear amounts $\Delta T_A$ and $\Delta T_B$ and by tilt amounts $\Delta S_A$ and $\Delta S_B$, which are amounts of the brake levers 3A and 3B tilted toward the brake disk 2 corresponding to a lever length H from the centers of the shafts 5A and 5B to the centers of the shafts 7A and 7B, and are turned to $S_A+\Delta S_A$ and $S_B+\Delta S_B$, respectively.

On the other hand, when the brake linings 9A and 9B are worn out, the automatic wear compensating unit 53 adjusts the connecting unit 34 such that the distance L (effective length) between the shafts 35 and 43 is decreased. With the distance L between the shafts 35 and 43 being decreased, effective stroke of the thruster 20 is substantially the same as that of the initial setting, so that gaps $G_{A'}$ and $G_{B'}$ ($G_{A'}=G_{B'}$) between the brake linings 9A and 9B and the brake disk 2 in the case where braking is released with brake linings 9A and 9B worn out are substantially equal to the gaps $G_A$ and $G_B$ at the initial setting as shown in FIG. 17 ($G_{A'}=G_A$; $G_{B'}=G_B$). For this reason, even when the braking is released, there remain the gaps $\Delta S_A$ and $\Delta S_B$ between the lower ends of the adjusting bolts 10A and 10B and the upper surfaces of the base seats 12A and 12B. Unbalanced application of the push-down force of the spring 31 will cause, as shown in FIG. 20, the brake levers 3A and 3B to be tilted about the shafts 5A and 5B toward the brake lever 3A. The adjusting bolt 10A is contacted at its lower end with the upper surface of the base seat 12A, and the gap between the lower end of the adjusting bolt 10A and the upper surface of the base seat 12B is increased to $\Delta S_A+\Delta S_B$. The gaps between the brake linings 9A and 9B and the brake disk 2 are turned to $GA+\Delta G$ and $G_B-\Delta G$, respectively, and become unbalanced.

Accordingly, even when adjustment is performed by the automatic wear compensating unit 53 as described above to automatically decrease the gaps caused by wear of the brake linings 9A and 9B, if protrusion of the adjusting bolts 10A and 10B is not adjusted, the gap "$G_B-\Delta G$" between the brake lining 9B and the brake disk 2 is turned to zero and the gap between the brake lining 9A and the brake disk 2 is turned to "$G_A+G_B$" at the brake releasing, so that the brake lining 9B unbalancedly or biasedly contacts the brake disk 2, which is very disadvantageous.

In the disk brake device of this type, when braking is released by opening the brake levers 3A and 3B at their upper ends, the brake levers 3A and 3B are not stabilized in position unless the adjusting bolt 10A or 10B of the stopper 11A or 11B is abutted at its lower end on the upper surface of the base seat 12A or 12B. Thus, it is a normal concept to design such that the push-down force of the spring 31 is positively unbalanced or biased toward the brake lever 3A so that the adjusting bolt 10A is preferentially caused to abut at its lower end on the upper surface of the base seat 12A to stabilize operation of the brake levers 3A and 3B in the non-braking condition. As the example shown in the figures, it is generally designed such that the push-down force of the spring 31 is biased toward the brake lever 3A which is away from the thruster 20.

However, in a case of changing the position of the spring 31, the structure of the lever mechanism 55 or the like, the push-down force of the spring 31 may be biased toward the brake lever 3B.

The present invention is directed to a disk brake device comprising a pair of brake levers opposedly arranged to clamp and brake a vertically rotated brake disk from opposite sides through brake linings, said brake levers being pivoted at their lower ends to a base plate so as to open and close the brake disks at their upper ends, a lever mechanism pivotally supported on an upper end of one of the brake levers, a connecting unit for connecting a portion of the lever mechanism with an upper end of the other brake lever, a thruster for pushing up the portion of the lever mechanism to open the brake levers at their upper ends, a spring for pushing down the portion of the lever mechanism when the thruster is not activated so as to close the brake levers at their upper ends and an automatic wear compensating unit for shortening effective length of the connecting unit based on relative displacement of the lever mechanism and the connecting unit corresponding to wear of the brake linings.

SUMMARY OF THE INVENTION

It is an object of the invention to assure that the brake levers are reliably maintained at positions opened equally at left and right in brake releasing, even when brake linings are worn out, and that gaps caused by wear of brake linings are automatically decreased by an automatic wear compensating unit. In accordance with the present invention, this object is achieved in that one of the brake levers, which is tilted down by force of the springs upon opening operation of the brake levers, has, at its lower portion, an outwardly protruding stopper with an adjusting bolt vertically screwed therein, in that the base plate has a base seat just below said stopper for receiving a lower end of the adjusting bolt, that said adjusting bolt has a pinion which is fitted over an upper end of the adjusting bolt via a one-way clutch so that the adjusting bolt can be rotated only in a direction of fastening the bolt downward, and in that a rack is meshed with said pinion to have a predetermined backlash, extends in a direction of swing of the brake levers and is supported by the base plate.

Therefore, when the lever mechanism is pushed up by the thruster to open the brake levers at their upper ends, the brake linings of the brake levers are separated from the brake disk to release the braking. When the thruster is not activated, the lever mechanism is pushed down by the spring to close the brake levers, and the brake linings clamp and brake the brake disk.

As described above, during brake releasing or braking operation to the brake disk, the pinion of the stopper is relatively moved with respect to the fixed rack by swing movements of the brake levers. When the brake linings are not worn out and the amount of swing of each of the brake levers is normal, relative displacement of the pinion to the rack is allowed by the backlash and the pinion is maintained without being rotated.

On the other hand, when the brake linings are worn out, the amount of swing of each of the brake levers increases and the effective length of the connecting unit is shortened by the automatic wear compensating unit based on relative displacement of the lever mechanism and connecting unit corresponding to the amount of wear of the brake linings. As a result, the gaps formed by the wear of the brake linings are automatically decreased. At the same time, the relative displacement of the pinion to the rack exceeds the backlash set between the two and the pinion is reciprocally rotated by the rack, so that the adjusting bolt is intermittently rotated only in a direction of fastening it downward by the one-way clutch. The adjusting bolt is moved down with respect to the stopper to decrease the gap between the lower end of the adjusting bolt and the upper surface of the base seat.

With the decreased gap between the lower end of the adjusting bolt and the upper surface of the base seat, the amount of swing of the brake lever is decreased which is confined by the abutment of the adjusting bolt at its lower end on the upper surface of the base seat, and the amount of relative movement of the pinion to the rack is also decreased. When the amount of the relative movement becomes equal to the backlash, the pinion ceases to rotate and the amount of swing of the brake lever is brought back to the amount of swing before the wear of the brake linings As a result, the gap between the lower end of the adjusting bolt and the upper surface of the base seat during closing operation of the brake levers by the spring is automatically brought back to the value before the wear of the brake linings.

In summary, even when brake linings are worn out and the effective length of the connecting unit is shortened by the automatic lining wear adjusting unit to automatically decrease the gap caused by wear of the brake linings, the gap between the lower end of the adjusting bolt and the upper surface of the base seat during closing operation of the brake levers can be automatically brought back to the dimension at the initial setting before the wear of the brake linings. Accordingly, the movement of the brake lever to which push-down force is applied during opening operation is confined by the abutment of the adjusting bolt at its lower end on the upper surface of the base seat to assuredly maintain the brake levers at equally opened positions at left and right. Also, in the brake releasing condition, biased application of pressure on the brake disk by the brake linings can be prevented to ensure that perfect braking operation may be made at all times.

BRIEF DESCRIPTION OF THE DRAWINGS

The present invention will be more apparent from the following description of a preferred, but not limiting embodiment with reference to the attached drawings, wherein.

DETAILED DESCRIPTION OF THE PREFERRED EMBODIMENT

Figure 1:
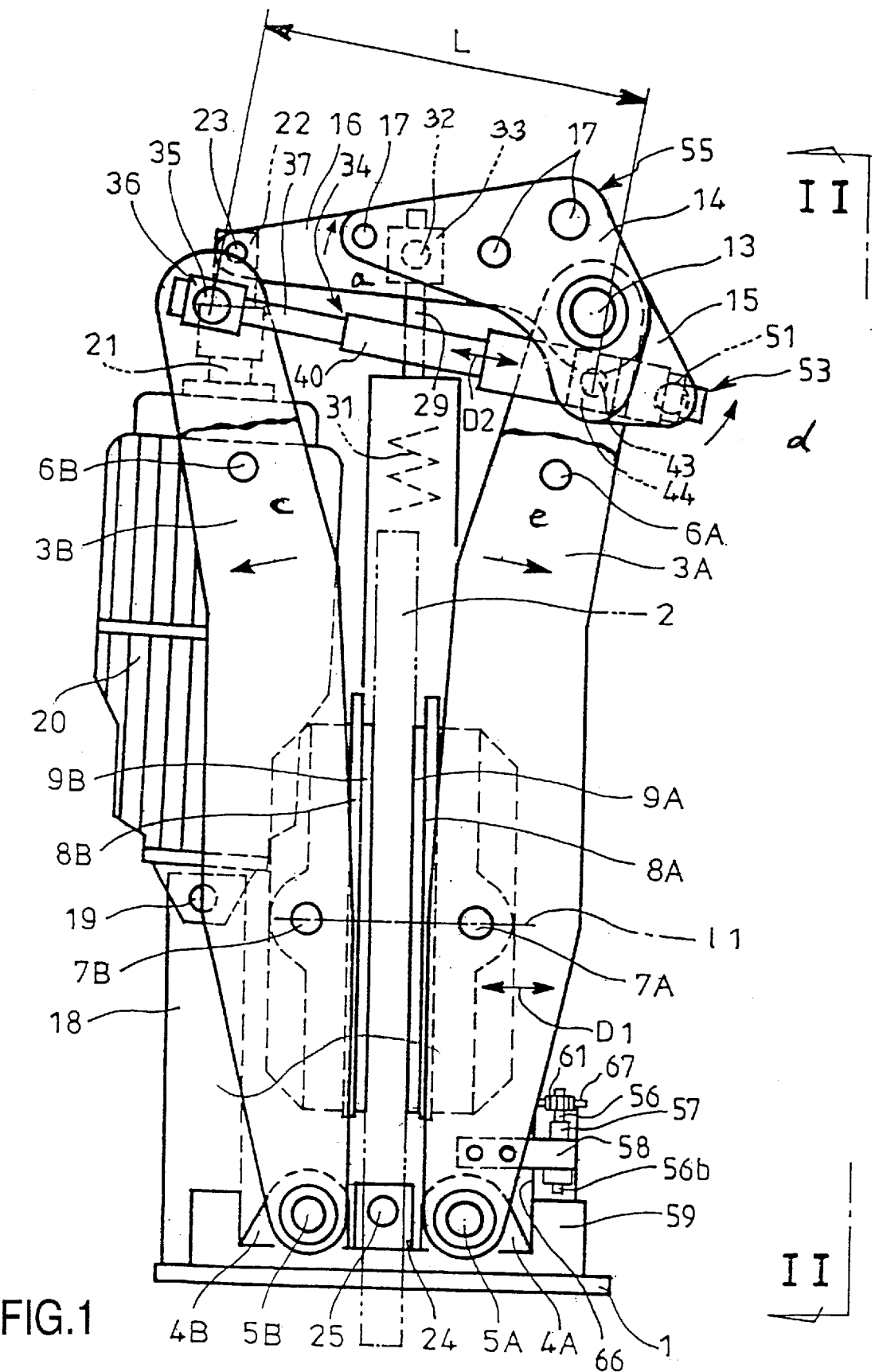
FIG. 1: is a front view of an embodiment of the present invention.
Figure 2:
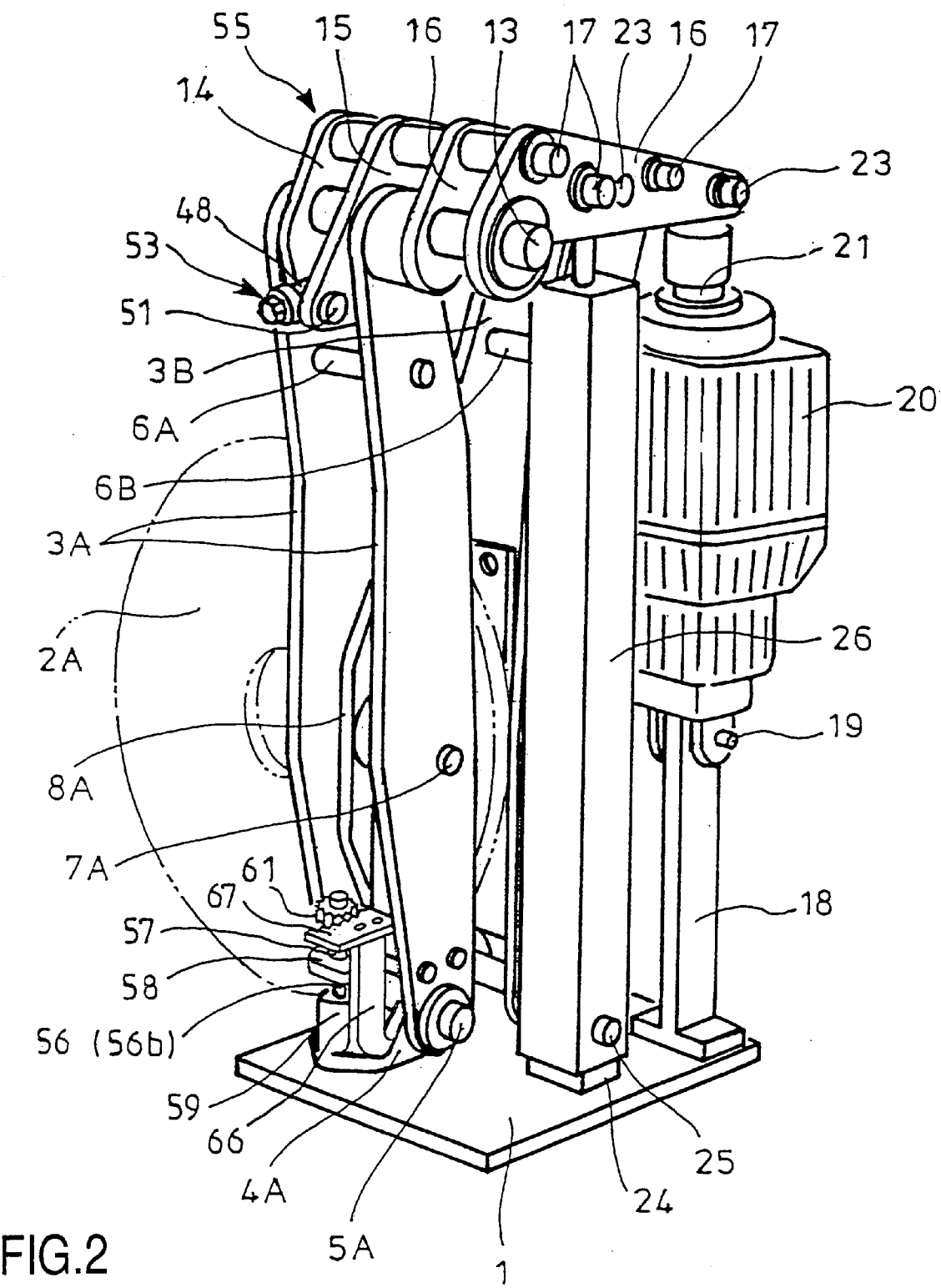
FIG. 2: is a perspective view in the direction II—II shown in FIG. 1.
Figure 3:
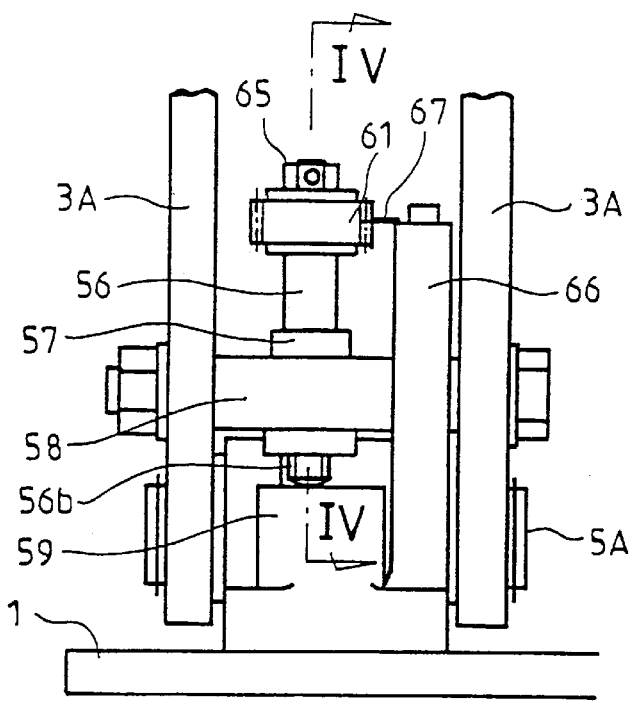
FIG. 3: is a side view showing an position relationship between a pinion and a rack of an adjusting bolt shown in FIG. 1.

FIGS. 1 to 8 represent an embodiment of the present invention in which same components as shown in FIGS. 9 to 20 are referred to by the same reference numerals.

In this embodiment, a brake lever 3A toward which tilting force is applied by a spring 31 in opening operation is formed at its lower portion with an outwardly protruding stopper 58 into which in turn a male screw portion 56b of an adjusting bolt 56 is screwed vertically via a thread sleeve 57. A base seat 59 is provided on a base plate 1 immediately under the stopper 58 so as to receive a lower end of the adjusting bolt 56.

Figure 4:
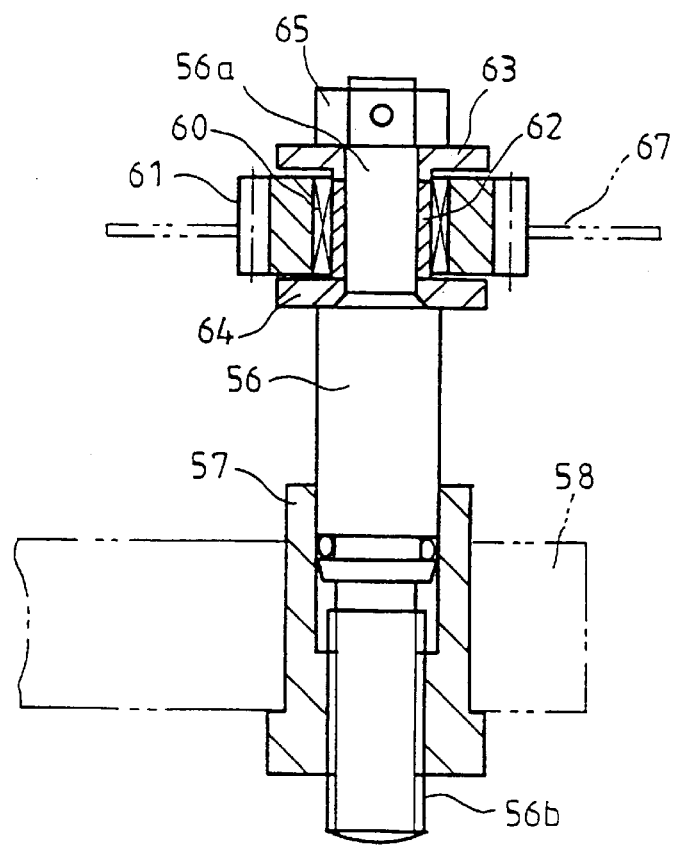
FIG. 4: is a sectional view showing details of an adjusting bolt in the direction IV—IV shown in FIG. 3.
Figure 5:
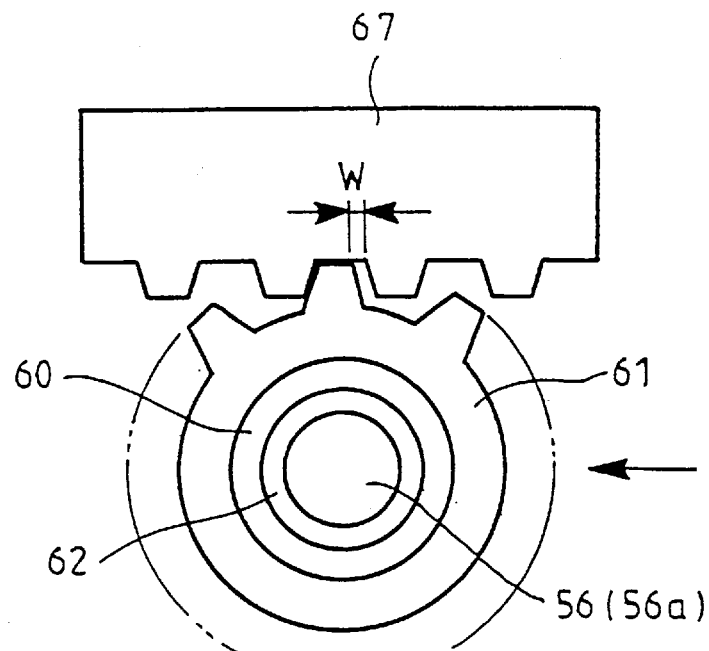
FIG. 5: is a view to explain operation of the pinion during braking prior to wear of brake linings.

As detailedly shown in FIG. 4, the adjusting bolt 56 has at its upper end a small diameter portion 56a over which a pinion 61 is fitted via a one-way clutch 60 so that the adjusting bolt 56 can be rotated only in a direction of fastening it downward. The pinion 61 is rotatably retained from above and below by a distance ring 63 and a thrust washer 64 which are spaced apart from each other axially of the adjusting bolt 56 via an inner ring 62 which in turn is fitted over the small diameter portion 56a inside the one-way clutch 60. The pinion 61 is prevented from falling off by a fixing nut 65.

Figure 12:
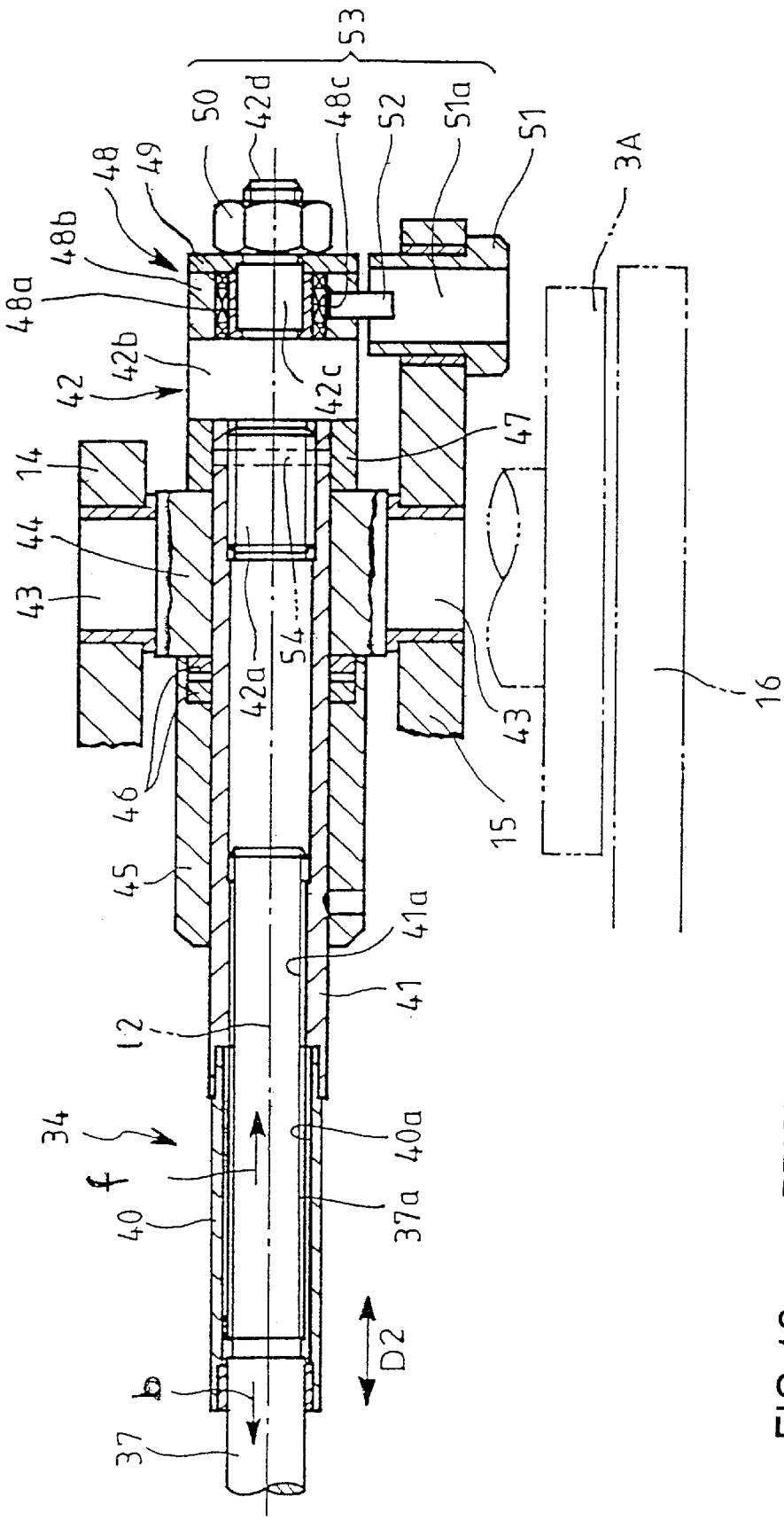
FIG. 12: is a sectional view showing details of an automatic wear compensating unit in the direction XII—XII shown in FIG. 9.
Figure 13:
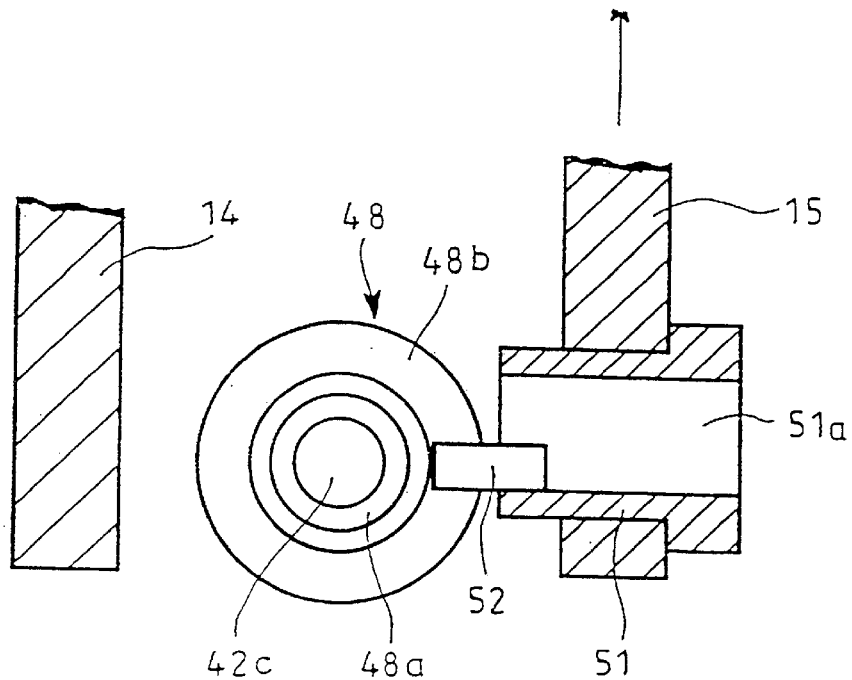
FIG. 13: is a view to explain the automatic wear compensating unit during braking prior to wear of the brake linings.
Figure 14:
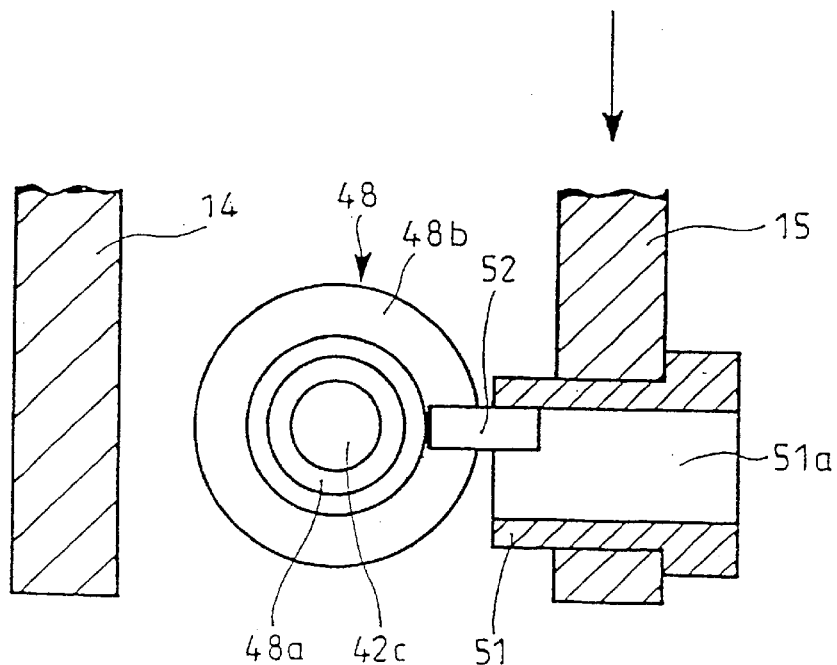
FIG. 14: is a view to explain the automatic wear compensating unit during brake releasing prior to wear of the brake linings.
Figure 15:
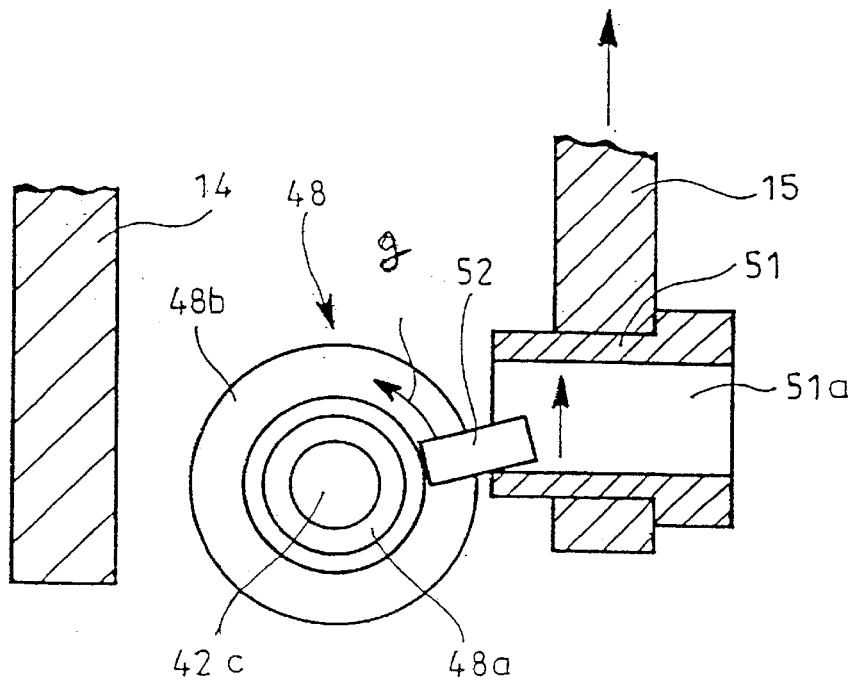
FIG. 15: is a view to explain operation of the automatic wear compensating unit during braking after wear of the brake linings.
Figure 16:
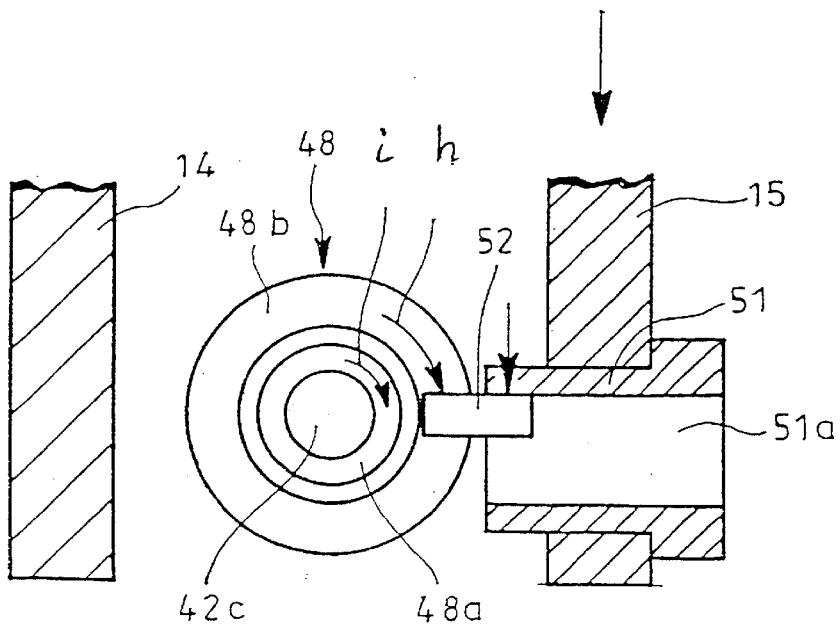
FIG. 16: is a view to explain operation of the automatic wear compensating unit during brake releasing after wear of the brake linings.
Figure 17:
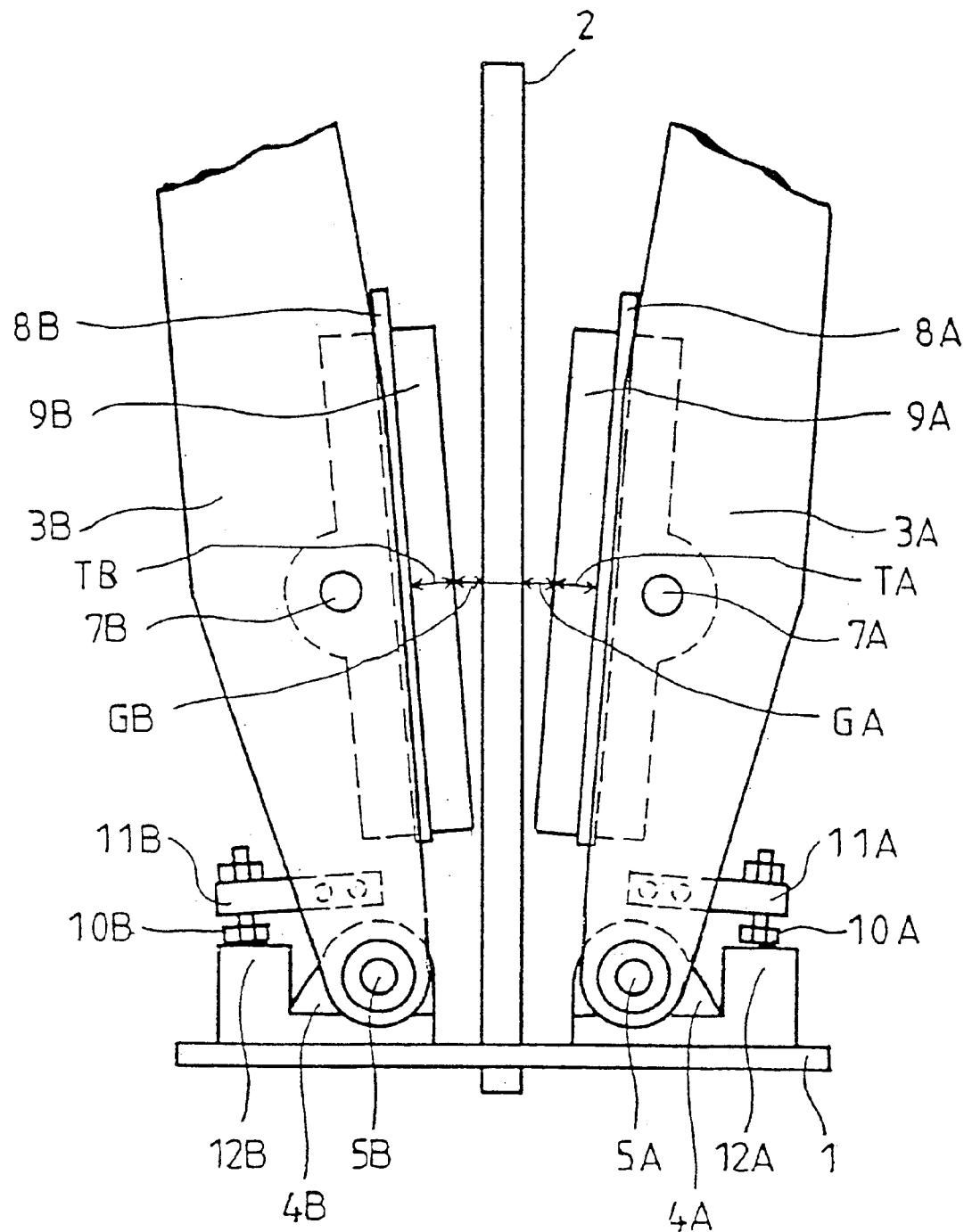
FIG. 17: is a view to explain operation of each of the brake levers during braking prior to wear of the brake linings.
Figure 18:
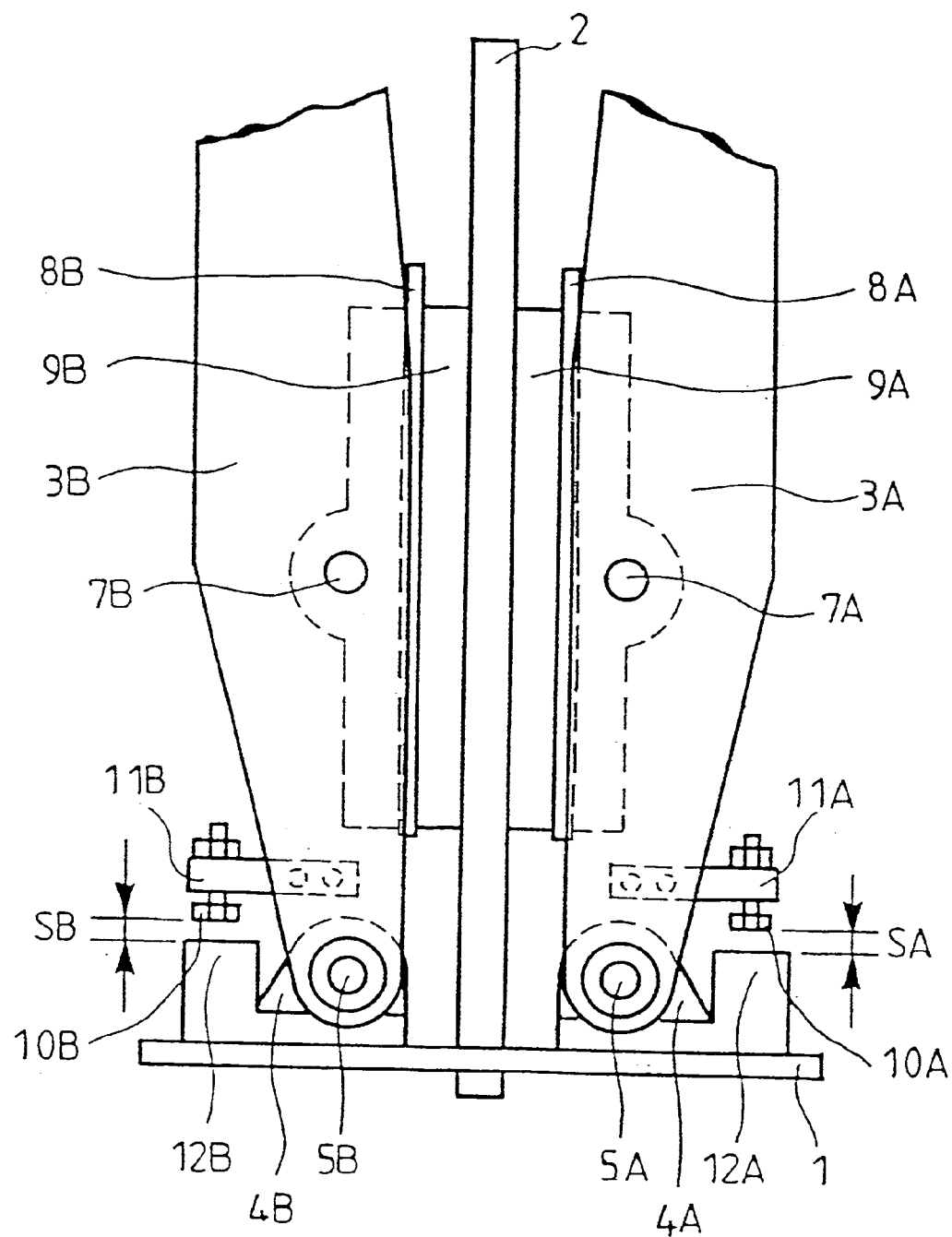
FIG. 18: is a view to explain operation of each of the brake levers during brake releasing prior to wear of the brake linings.
Figure 19:
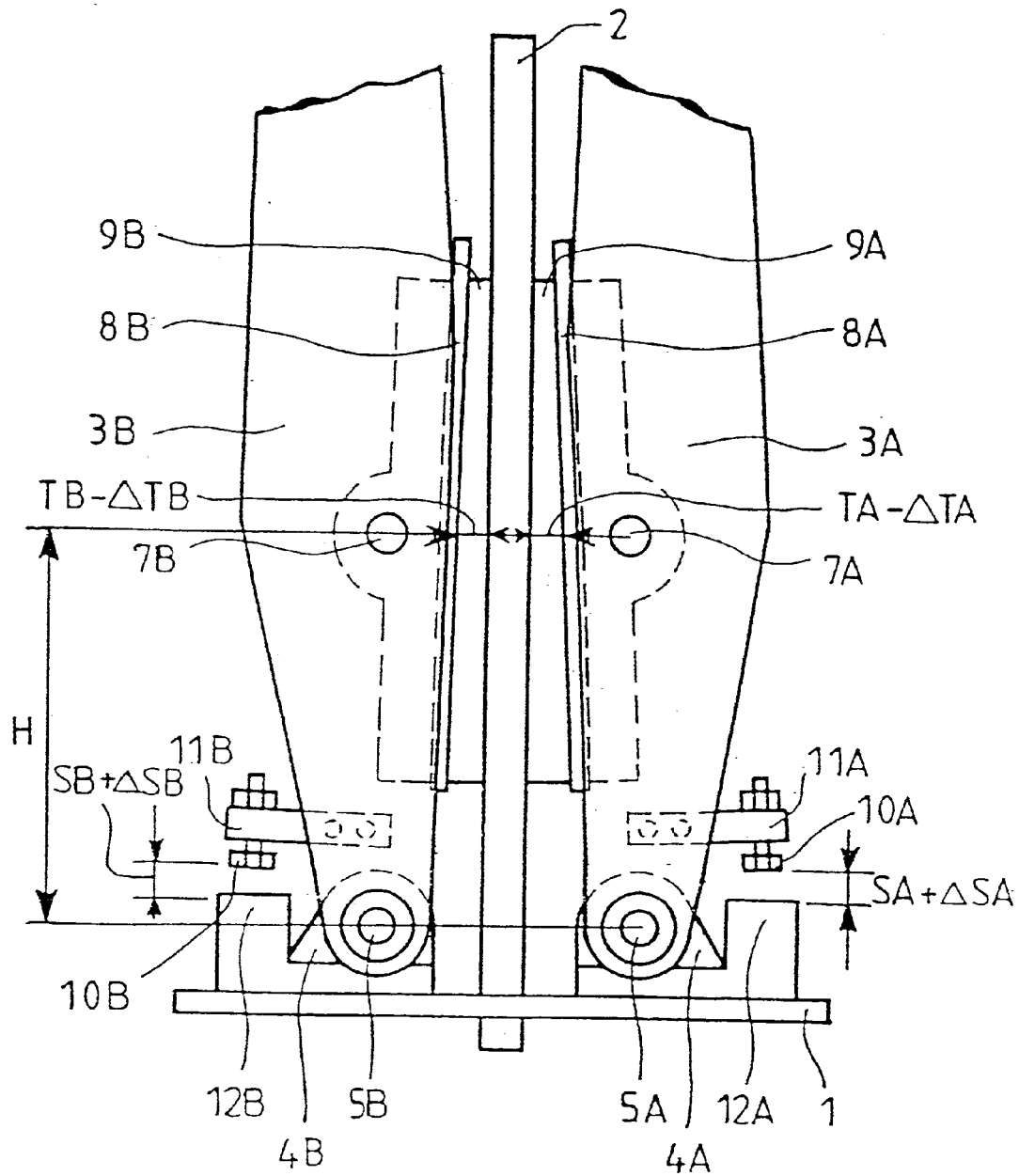
FIG. 19: is a view to explain operation of each of the brake levers during braking after wear of the brake linings.
Figure 20:
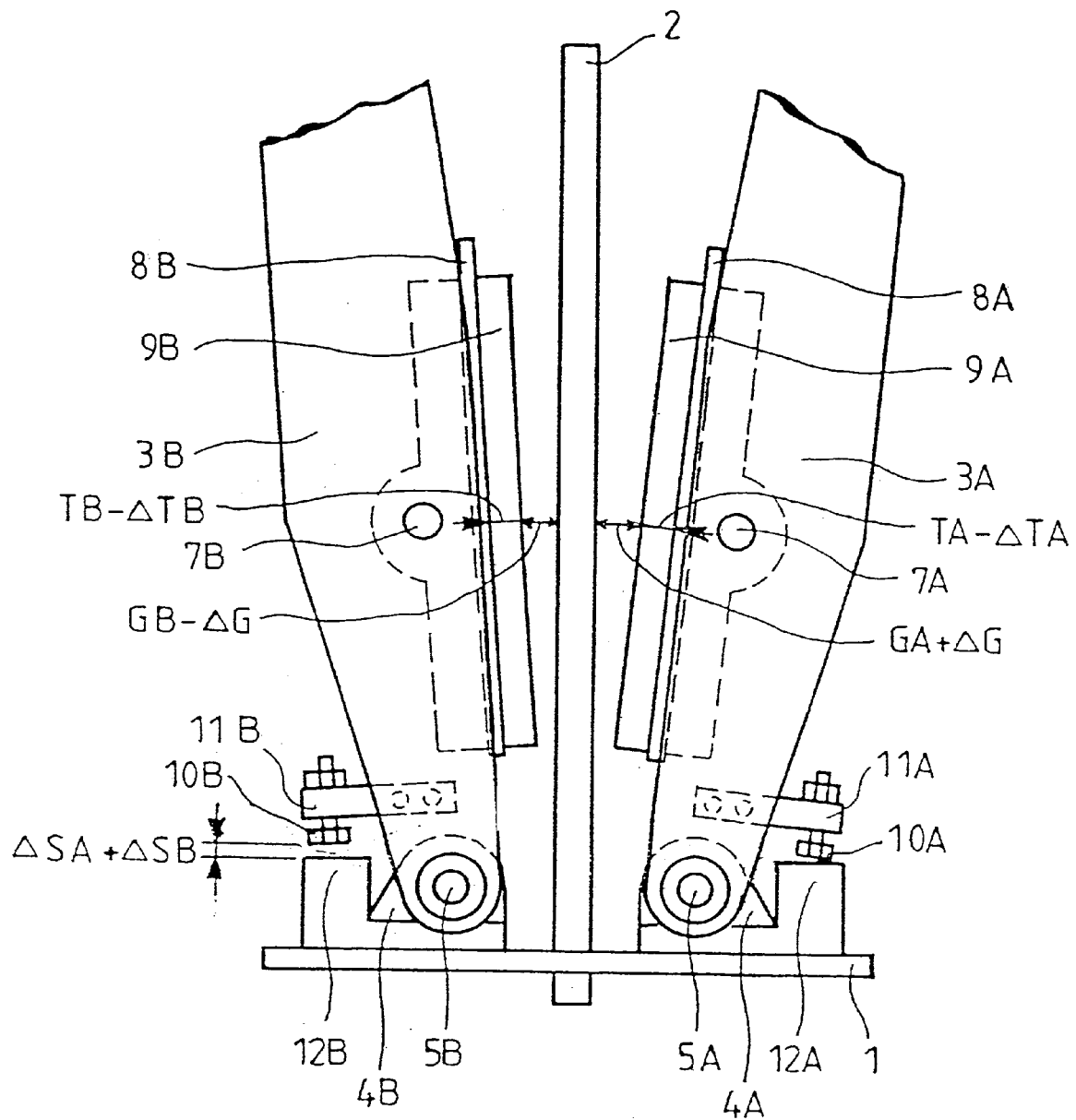
FIG. 20: is a view to explain operation of each of the brake levers during brake releasing after wear of the brake linings.

The one-way clutch 60 may have substantially the same structure as that of the one-way clutch 48 of the automatic wear compensating unit 53 as explained in connection with FIG. 12.

The base plate 1 is integrally formed, at its portion adjacent to the base seat 59, with a support stand 66 which extends substantially to the same level as that of the pinion 61 of the adjusting bolt 56. The support stand 66 has at its upper end a rack 67 which is meshed with the pinion 61 to have a predetermined backlash W (FIG. 5) and which extends in the direction of swing of the brake lever 3A.

The backlash W is set to such a dimension as to allow normal amount of swing of the brake lever 3A when the brake lining 9A is not worn out, so that the pinion 61 is not rotated by the rack 67 unless wear occurs on the brake lining 9A.

The amount of swing of the brake lever 3A at its lower end is very small compared with the amount of swing at its upper end and can be allowed even with the backlash W which can be set between the pinion 61 and the rack 67 as described above.

When the lever mechanism 55 comprising bent levers 16 and short levers 14 and 15 is pushed up by a thruster 20 to open the brake levers 3A and 3B at their upper ends, the brake linings 9A and 9B of the brake levers 3A and 3B are separated from the brake disk 2 to release the braking. When the thruster 20 is not activated, the lever mechanism 55 is pushed down by the spring 31 to close the brake levers 3A and 3B, and the brake linings 9A and 9B clamp and brake the brake disk 2.

Figure 6:
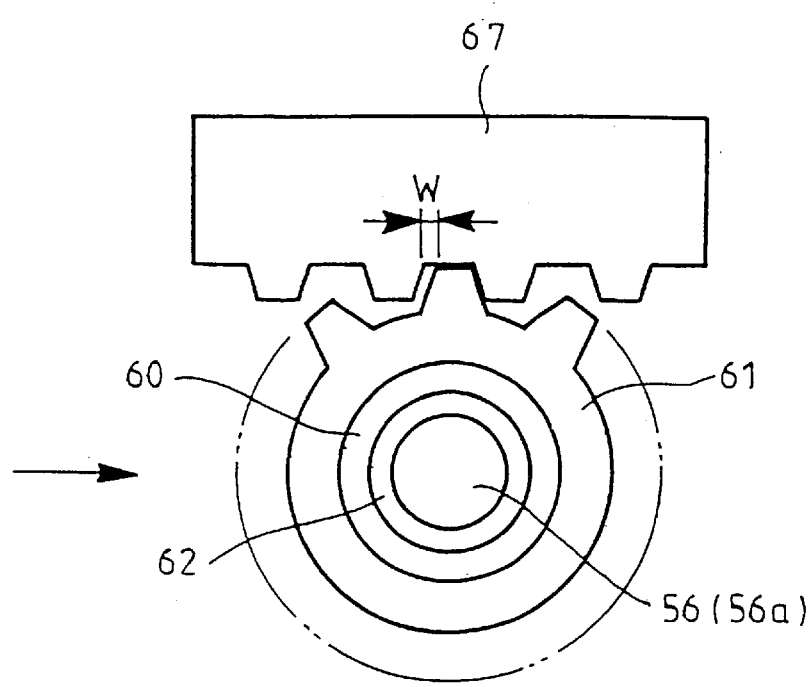
FIG. 6: is a view to explain operation of the pinion during brake releasing prior to wear of the brake linings.

As described above, during brake releasing or braking on the brake disk 2, the pinion 61 of the stopper 58 is relatively moved with respect to the fixed rack 67 by swing movement of the brake lever 3A. For example, in the braking operation with the thruster 20 being not activated, the pinion 61 is moved toward the left in FIG. 5. In the brake releasing condition with the thruster 20 being activated, the pinion 61 is moved back toward the right as shown in FIG. 6. With the normal amount of swing of the brake lever 3A when the brake lining 9A is not worn out, relative displacement of the pinion 61 to the rack 67 is allowed by the backlash W and the pinion 61 is retained without being rotated.

On the other hand, when the brake linings 9A and 9B are worn out, the amount of swing of each of the brake levers 3A and 3B increases, and the effective length (distance L) of the connecting unit 34 is shortened in response to amounts of wear of the brake linings 9A and 9B by the automatic wear compensating unit 53 based on relative displacement of the lever mechanism 55 and the connecting unit 34, so that the gap caused by wear of the brake linings 9A and 9B is automatically decreased. At the same time, the relative displacement of the pinion 61 to the rack 67 also exceeds the backlash W set between the two, and, for example in the braking condition with the thruster 20 being not activated, the brake lever 3A is swung about the shaft 5A toward the brake disk 2 at greater extent than the case where the brake lining 9A is not worn out, so that the pinion 61 is moved to the position shown in FIG. 7 and is rotated clockwise by the rack 67 in a direction j.

Figure 7:
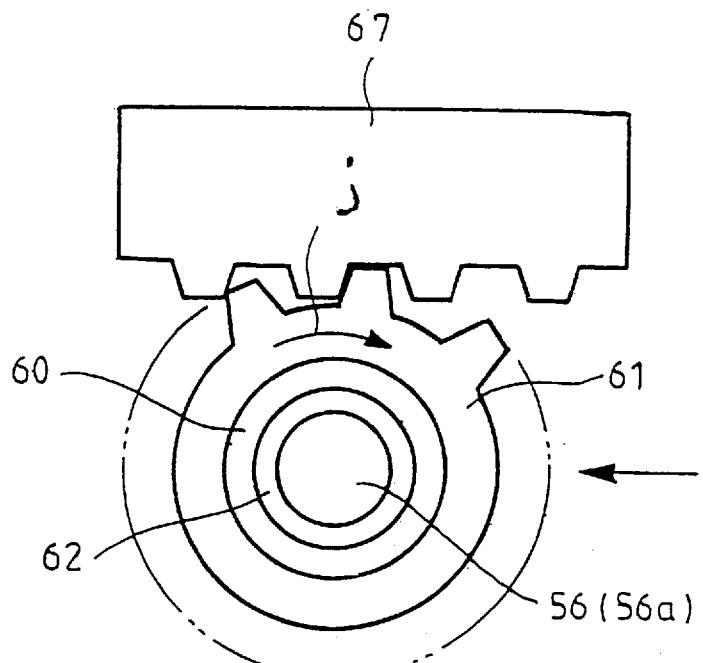
FIG. 7: is a view to explain operation of the pinion during braking after wear of the brake linings.
Figure 8:
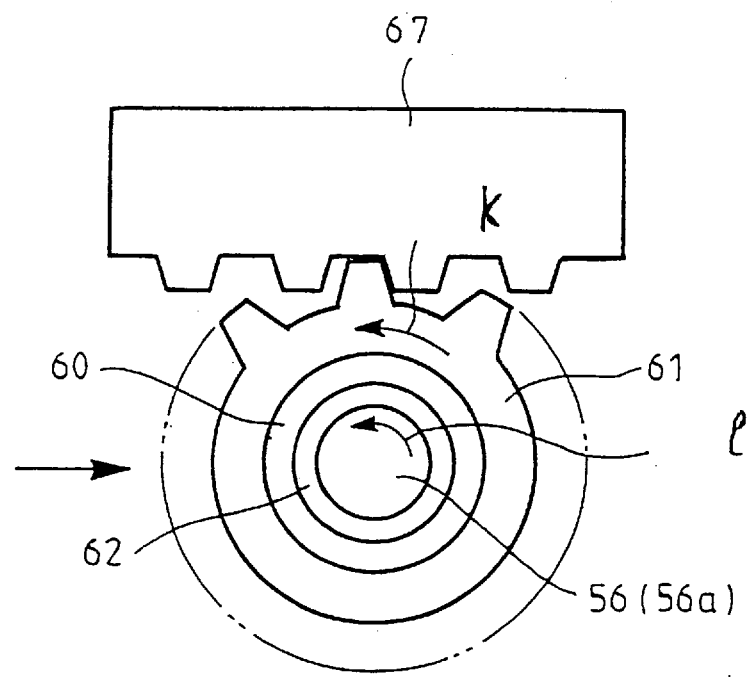
FIG. 8: is a view to explain operation of the pinion during brake releasing after wear of the brake linings.
Figure 9:
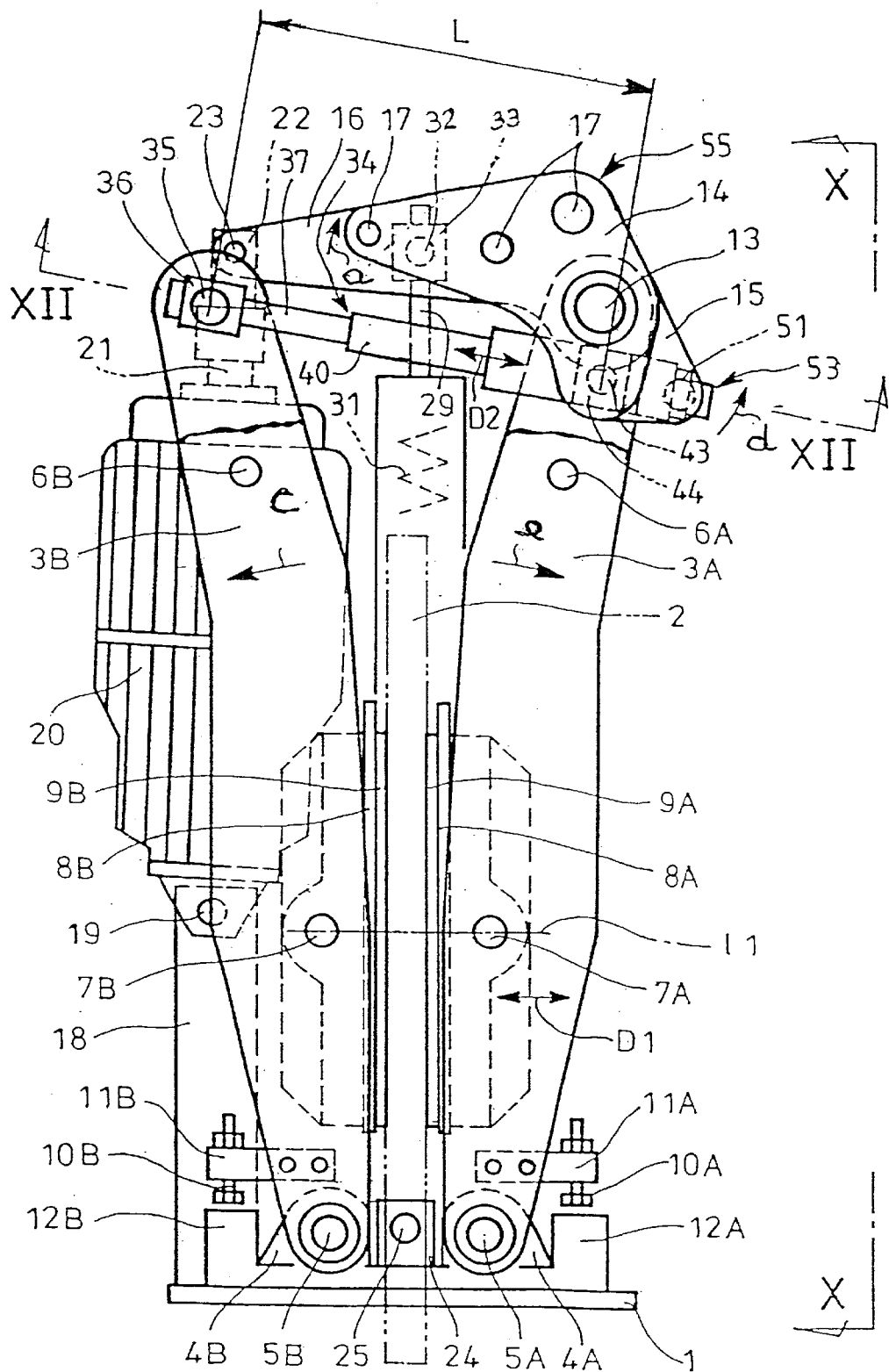
FIG. 9: is a front view of a conventional device.
Figure 10:
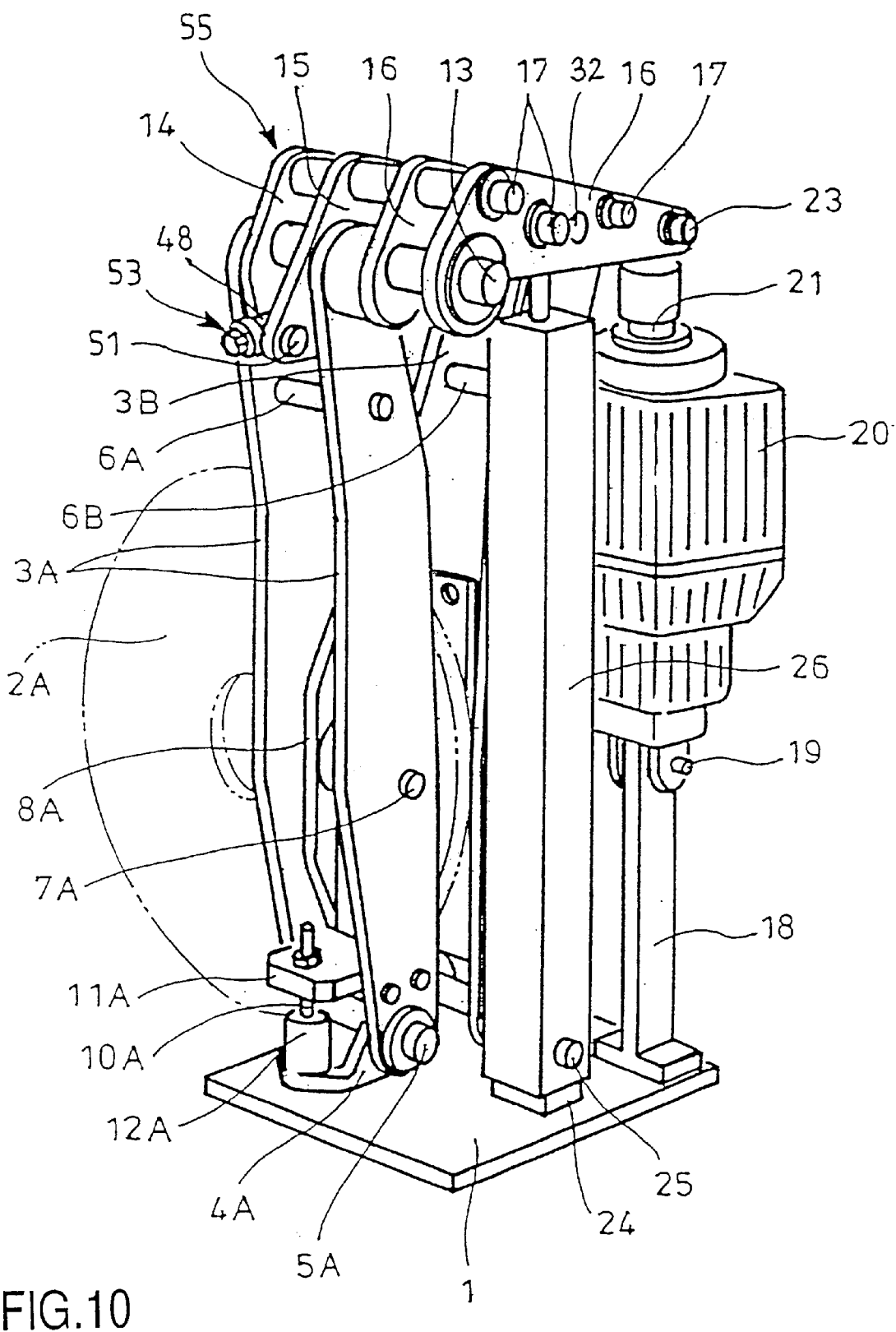
FIG. 10: is a perspective view in the direction X—X shown in FIG. 9.
Figure 11:
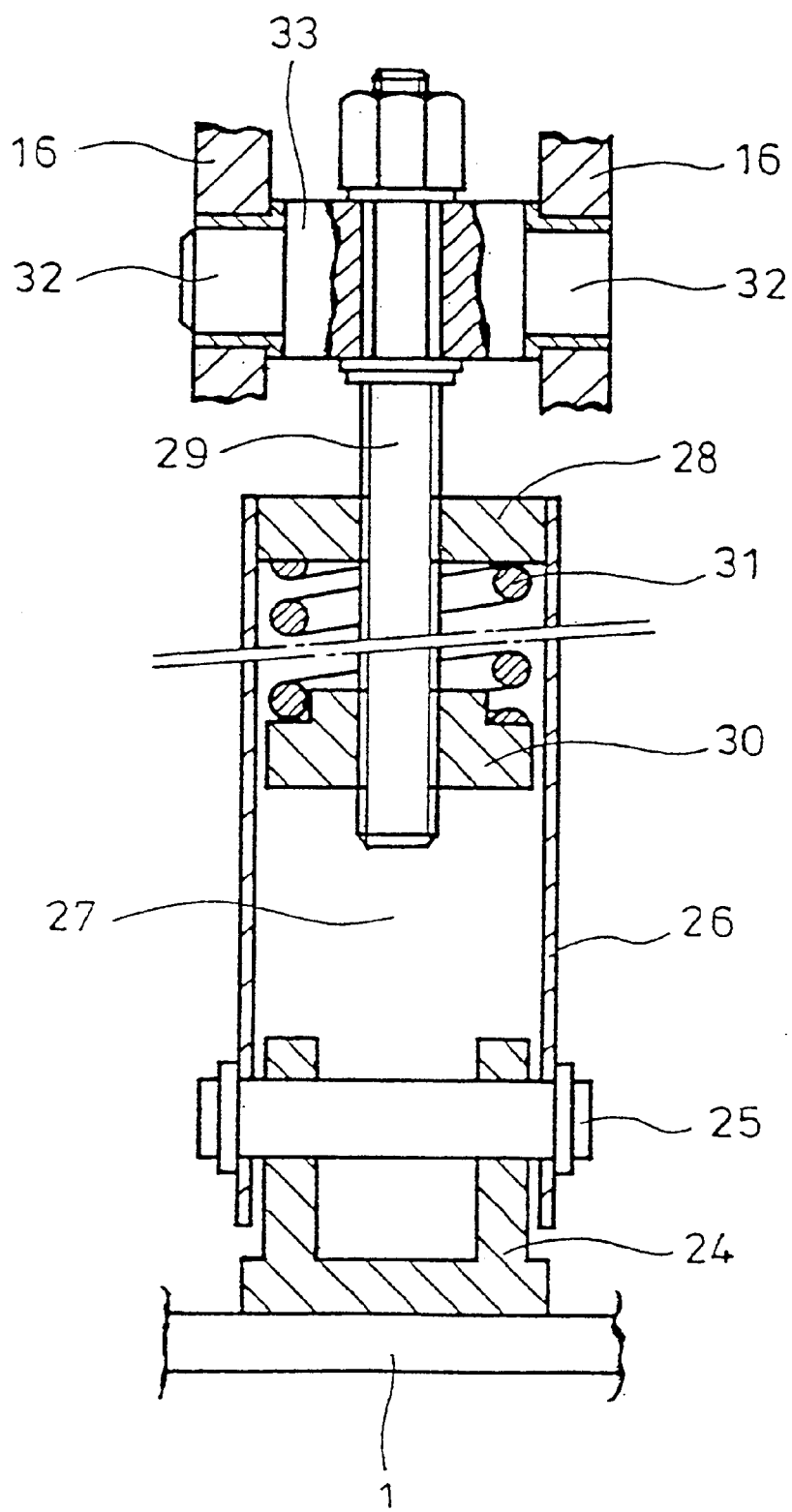
FIG. 11: is a sectional view showing detailed arrangement of a spring shown in FIG. 9.

In this case, provided that a fastening direction of the adjusting bolt 56 in FIG. 7 is clockwise, the pinion 61 is idly rotated with respect to the adjusting bolt 56 by the one-way clutch 60. In the brake releasing condition with the thruster 20 being activated, when the pinion 61 is moved back to the position as shown in FIG. 8, the pinion 61 and the adjusting bolt 56 are rotated clockwise in unison by the one-way clutch 60 in directions k and l, so that the adjusting bolt 56 is fastened downward.

As described above, the pinion 61 is reciprocally rotated by the rack 67 and the adjusting bolt 56 is intermittently rotated only in the direction of fasting the bolt 56 downward by the one-way clutch 60. As a result, the adjusting bolt 56 is moved down with respect to the stopper 58 to decrease the gap between the lower end of the adjusting bolt 56 and the upper surface of the base seat 59.

With the decreased gap between the lower end of the adjusting bolt 56 and the upper surface of the base seat 59, the amount of swing of the brake lever 3A confined by abutment of the adjusting bolt 56 at its lower end on the upper surface of the base seat 59 is decreased and relative movement of the pinion 61 to the rack 67 is also decreased. When the amount of such relative movement becomes equal to the backlash, the pinion 61 ceases to rotate, and the amount of swing of the brake lever 3A is brought back to the amount of swing before wear of the brake lining 9A. Thus, the gap between the lower end of the adjusting bolt 56 and the upper surface of the base seat 59 during closing operation of the brake levers 3A and 3B by a spring 31 is automatically brought back to a value before wear of the brake lining 9A.

Therefore, according to this embodiment, when the brake linings 9A and 9B are worn out and the effective length (distance L) of the connecting unit 34 is shortened by the automatic wear compensating unit 53 to automatically decrease the gap caused by wear of the brake linings 9A and 9B, the gap between the lower end of the adjusting bolt 56 and the upper surface of the base seat 59 during closing operation of the brake levers 3A and 3B can be automatically brought back to the value at the initial setting before wear of the brake linings 9A and 9B. Therefore, the movement of the brake lever 3A on which push-down force is applied during opening operation is confined by abutment of the adjusting bolt 56 at its lower end on the upper surface of the base seat 59 to assure that the brake levers 3A and 3B can be opened equally at left and right. Also, in the brake releasing condition, biased application of pressure on the brake disk 2 by the brake lining 9A or 9B is prevented to ensure that perfect braking may be performed at all times.

It is to be understood that the present invention is not limited to the above described preferred embodiment and that various changes and modifications may be made. For example, various structures and components other than those illustrated can be employed for the automatic wear compensating unit. The structure and the shape of the lever mechanism are not limited to those of the embodiment illustrated.

I claim:

1. A disk brake device comprising:
    a base plate;
    a vertically rotated brake disk;
    a pair of brake levers positioned on opposite sides of said vertically rotated brake disk in an axial direction and arranged with ability to open and close at their upper ends and to clamp and brake said vertically rotated brake disk from the opposite sides;
    a pair of brake linings positioned between said brake levers and said vertically rotated brake disk;
    a lever mechanism pivotally supported on an upper end of one of the brake levers;
    a connecting unit for connecting said lever mechanism with an upper end of the other brake lever;
    means for pushing up the lever mechanism, so as to open the brake levers at their upper ends;
    means for pushing down the lever mechanism, so as to close the brake levers at their upper ends;
    an automatic wear compensating unit for shortening effective length of the connecting unit based on relative displacement of the lever mechanism and the connecting unit corresponding to wear of the brake linings;
    an outwardly protruding stopper mounted on the lower part of one of the brake levers, said protruding stopper having an adjusting means vertically installed therein;
    a rotating means for providing movement of the adjusting means downward and preventing its movement upward; and
    a rack supported by the base plate and extending in a direction of swing of the brake levers, said rack being meshed with said rotating means to have a predetermined backlash.

2. The disk brake device according to claim 1, wherein said brake levers are pivotally mounted at their lower ends and may be pivoted toward said base plate.

3. The disk brake device according to claim 2, further including a base seat on said base plate just below said stopper for receiving a lower end of the adjusting means.

4. The disk brake device according to claim 3, wherein the adjusting means is an adjusting bolt.

5. The disk brake device according to claim 4, wherein the means for pushing down the lever mechanism is a spring.

6. The disk brake device according to claim 5, wherein the stopper is tilted down by force of the spring upon opening operation of the brake levers.

7. The disk brake device according to claim 6, wherein the rotating means includes a pinion fitted over an upper end of the adjusting bolt via a one-way clutch, so that the adjusting bolt can be rotated only in a direction of screwing the bolt downward.

8. The disk brake device according to claim 1, wherein the lever mechanism includes at least two interconnected moving parts which can be swung in unison in vertical planes in parallel with a vertical plate on which the brake levers are swung.

9. The disk brake device according to claim 8, wherein the lever mechanism comprising two short levers and two bent levers interconnected by a pivot shaft.

10. The disk brake device according to claim 9, wherein the short levers are substantially in the form of inverted L.

11. The disk brake device according to claim 9, wherein the bent levers are substantially in the form of inverted L.

12. A disk brake device comprising:
    a base plate;
    a vertically rotated brake disk;
    a pair of brake levers with brake linings, said brake levers pivotaly mounted so as their lower ends can be pivoted to said base plate in order to open and close at their upper ends and to clamp and brake said vertically rotated brake disk from opposite sides with their brake linings;
    a lever mechanism pivotally supported on an upper end of one of the brake levers;
    a connecting unit for connecting a portion of said lever mechanism with an upper end of the other brake lever;
    a thruster for pushing up the portion of the lever mechanism, so as to open the brake levers at their upper ends;
    a spring for pushing down the portion of the lever mechanism when the thruster is not activated, so as to close the brake levers at their upper ends;
    an automatic wear compensating unit for shortening effective length of the connecting unit based on relative displacement of the lever mechanism and the connecting unit corresponding to wear of the brake linings;
    an outwardly protruding stopper on the lower portion of one of the brake levers which is tilted down by force of the spring upon opening operation of the brake levers, said protruding stopper having an adjusting bolt vertically screwed therein;
    a pinion fitted over an upper end of the adjusting bolt via a one-way clutch, so that the adjusting bolt can be rotated only in a direction of screwing the bolt downward; and
    a rack supported by the base plate and extending in a direction of swing of the brake levers, said rack being meshed with said pinion to have a predetermined backlash.

13. The disk brake device according to claim 12, further including a base seat positioned on said base plate just below said stopper for receiving a lower end of the adjusting bolt.

14. The disk brake device according to claim 13, wherein the lever mechanism includes at least two interconnected moving parts which can be swung in unison in vertical planes in parallel with a vertical plane on which the brake levers are swung.

15. The disk brake device according to claim 14, wherein the lever mechanism comprising two short levers and two bent levers interconnected by a pivot shaft.

16. The disk brake device according to claim 15, wherein the short levers are substantially in the form of inverted L.

17. The disk brake device according to claim 15, wherein the bent levers are substantially in the form of inverted L.

18. The disk brake device according to claim 15, wherein the short levers are positioned on the pivot shaft between the plates of the brake lever.

19. The disk brake device according to claim 15, wherein the bent levers are positioned at the tips of the shaft lever.

20. A disk brake device comprising:

a base plate;

a vertically rotated brake disk;

a pair of brake levers with brake linings, said brake levers being pivoted at their lower ends to said base plate, so as to open and close at their upper ends and to clamp and brake said vertically rotated brake disk from the opposite sides with their brake linings;

a lever mechanism pivotally supported on an upper end of one of the brake levers;

a connecting unit for connecting a portion of said lever mechanism with an upper end of the other brake lever;

a thruster for pushing up the portion of the lever mechanism, so as to open the brake levers at their upper ends;

a spring for pushing down the portion of the lever mechanism when the thruster is not activated, so as to close the brake levers at their upper ends;

an automatic wear compensating unit for shortening effective length of the connecting unit based on relative displacement of the lever mechanism and the connecting unit corresponding to wear of the brake linings;

an outwardly protruding stopper on the lower portion of one of the brake levers which is tilted down by force of the spring upon opening operation of the brake levers, said protruding stopper having an adjusting bolt vertically screwed therein;

a base seat on said base plate just below said stopper for receiving a lower end of the adjusting bolt;

a pinion fitted over an upper end of the adjusting bolt via one-way clutch, so that the adjusting bolt can be rotated only in a direction of screwing the bolt downward; and a rack supported by the base plate and extending in a direction of swing of the brake levers, said rack being meshed with said pinion to have a predetermined backlash.

* * * * *